D. E. GRAY.
APPARATUS FOR RETAINING AND DELIVERING BLOW IRONS.
APPLICATION FILED MAY 29, 1919.
1,357,231.
Patented Nov. 2, 1920.
2 SHEETS—SHEET 1.
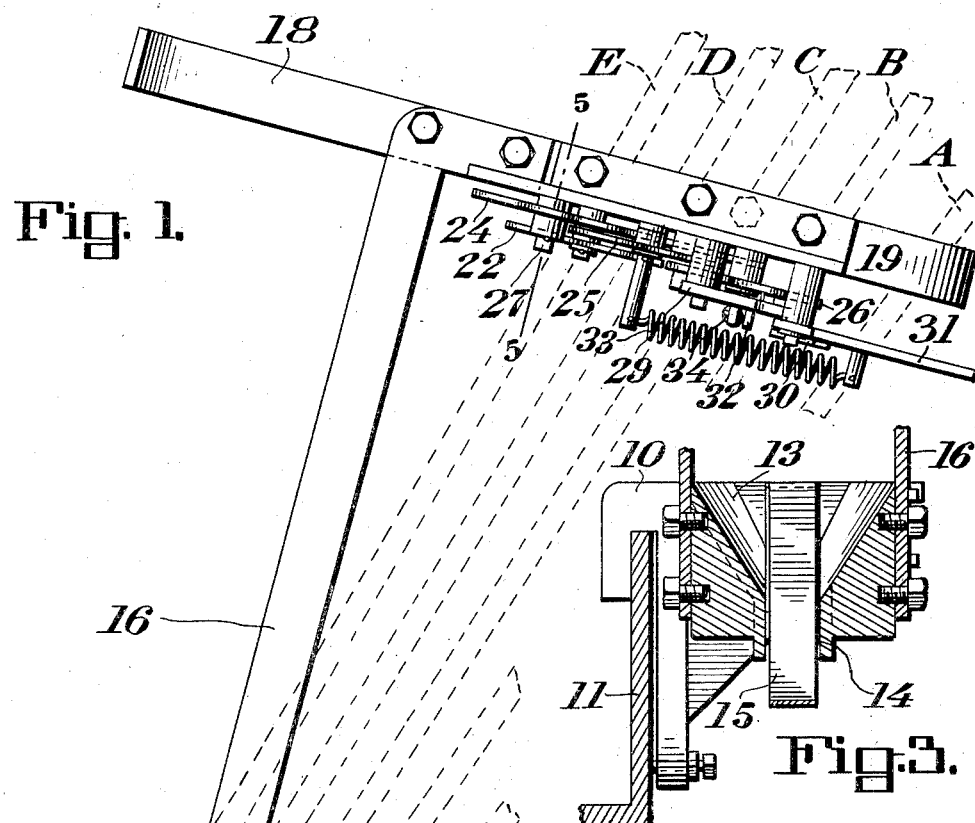
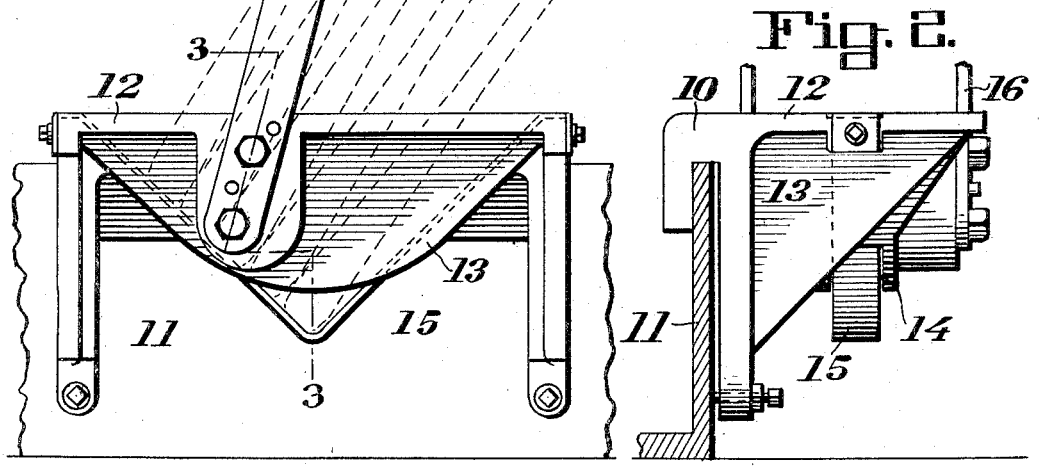
Inventor
David E. Gray
By
Attorney

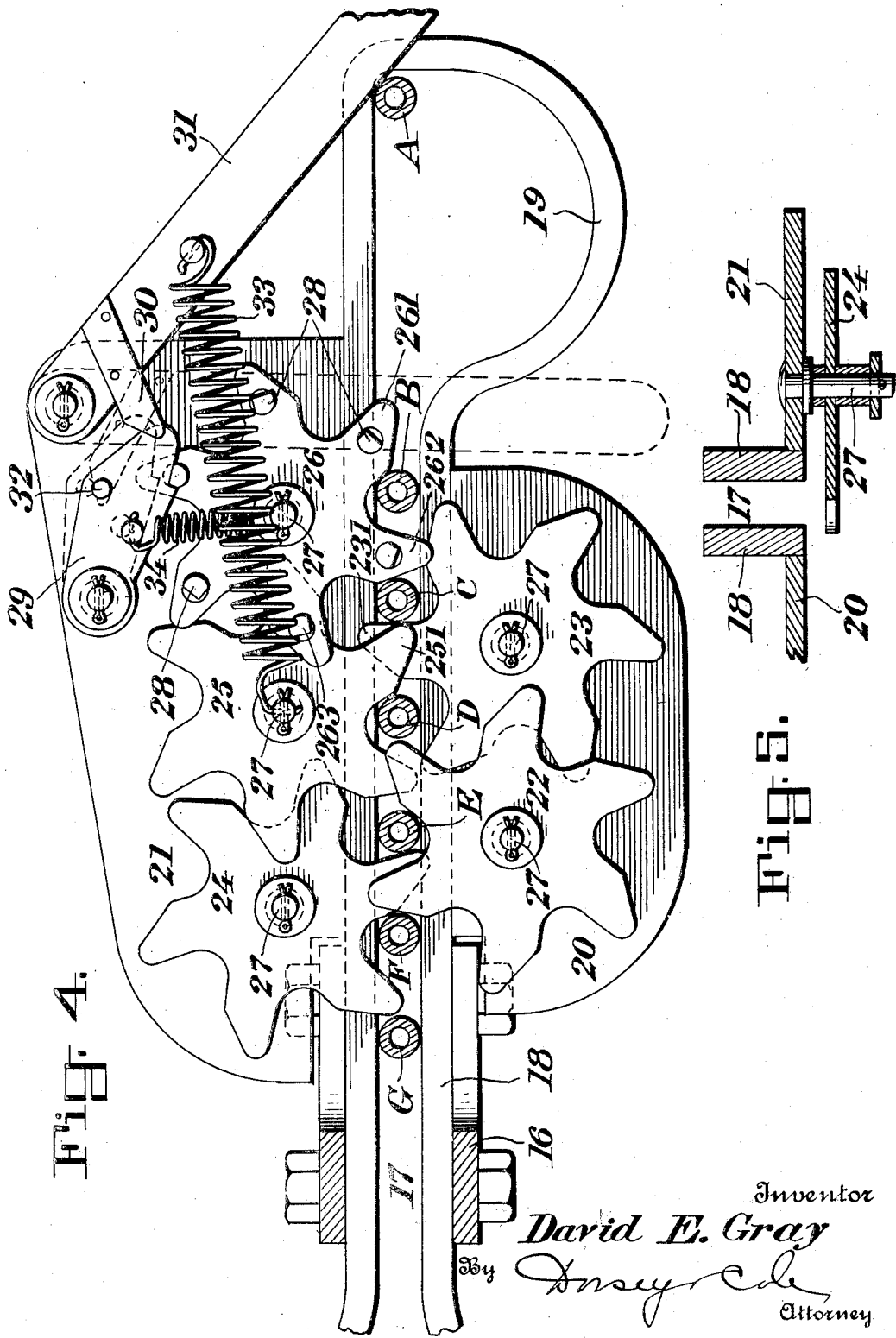

UNITED STATES PATENT OFFICE.

DAVID E. GRAY, OF CORNING, NEW YORK, ASSIGNOR TO THE CORNING GLASS WORKS, OF CORNING, NEW YORK, A CORPORATION OF NEW YORK.

APPARATUS FOR RETAINING AND DELIVERING BLOW-IRONS.

1,357,231.    Specification of Letters Patent.    Patented Nov. 2, 1920.

Application filed May 29, 1919. Serial No. 300,513.

*To all whom it may concern:*

Be it known that I, DAVID E. GRAY, a citizen of the United States of America, and a resident of the city of Corning, county of Steuben, and State of New York, have invented certain new and useful Improvements in Apparatus for Retaining and Delivering Blow-Irons, of which the following is a specification.

In blowing glass articles on blow-irons it is the practice for each "shop" to use a number of blow-irons, the gatherers collecting glass on one iron, while the glass previously gathered on another iron is being blown (either manually or by machine) and while the articles blown on other irons are cooling and being removed therefrom. It is desirable that the irons be used in turn, as only by so doing can uniform heat conditions (which should exist for the most efficient work) be maintained in the several irons of each shop.

My invention therefore relates to a device adapted to receive a number of blow irons, and to deliver them in the order in which they were fed thereto, for removal and use in gathering, and it is one of the objects thereof to accomplish this by utilizing gravity alone as the power to feed the irons through the device, thus dispensing with the expense and complexity which would result from the employment of a motor to accomplish this purpose, and the invention here claimed, consists in the construction, and in the arrangement and combination of the several parts, as will be hereinafter more fully described and claimed.

Referring to the accompanying drawings, wherein I have illustrated the preferred embodiment of my invention:

Figure 1, is an elevation of a device for receiving and delivering blow-irons a plurality of irons being shown held therein, by dotted lines;

Fig. 2, is a front view of the base portion thereof;

Fig. 3, is a vertical section on line 3—3, of Fig. 1;

Fig. 4, is an inverted plan view of the upper or head portion of the device shown in Fig. 1; and Fig. 5, is a vertical section on line 5—5, of Fig. 1.

In the drawings, the device as a whole is shown supported by a bracket 10 from a member 11, which may be the mold cooling water-pan of a glass blowing machine such as is shown in U. S. Patent No. 1,124,702, granted to B. D. Chamberlin, Jan. 12, 1915.

Integrally formed with the bracket 10 is a hopper comprising the horizontal member 12 extending from the bracket, and the body portion 13 extending downwardly therefrom. A vertical slot 14 extending through the portion 13 of the hopper has mounted therein a spring-like metallic strip 15, which is so positioned as to form the bottom of the hopper. Referring to Figs. 1, 2, and 3, it will be noted that the body portion of the hopper terminates somewhat above the lower and depressed portion of the strip 15. This construction is adopted for the reason that on the lower end of blow-iron (the gathering end thereof) particles of glass often remain after the moil has been stripped therefrom, so that when the blow-iron is placed in the present device, the lower end in seating against the depressed portion of the strip 15, will bounce slightly thus cleaning off any foreign matter. The latter will then pass out through the opening formed in the hopper bottom below the slot 14 thereof.

Located above the base portion of the device and supported by a pair of standards suitably secured thereto is the head portion, which is adapted to receive the body portions of the irons, to guide them. This portion of the device, generally speaking, comprises a guiding member, forming a slot 17, in line with the slot 14 in the base, and closed at its rear end; and means for controlling the feed of the irons toward the closed end of the slot. To provide a head suitable for these purposes, the construction shown in the drawings may be employed, viz., the slot 17 in the head is formed by bending a strip 18 back upon itself so as to provide parallel guiding members, separated from each other by a distance but slightly larger than the diameter of the blow iron body to be fed between them. At the entering (or front) end of the slot so formed, the members are flared outwardly, while the other (closed) end of the slot is bent out in a loop as at 19, forming an enlargement at such end of the slot. The strip 18 may be bolted on the upper ends of the standards 16, and to the outer sides of the two members of the strip are fastened angle members 20 and 21, on the lower surface of the horizontal portions of which the toothed wheels for controlling the feed of irons through the slot are mounted. Two wheels 22 and 23, are shown as mounted from the member 20, while three wheels, 24, 25 and 26, are shown mounted on the member 21.

Each toothed wheel, which is by preference of the contour shown in Fig. 4, is journaled in a separate stud 27, the radius of each wheel at the tip of the teeth being such that at certain angular positions of the wheel, at least two of its teeth project past the inner face of the adjacent member 18, thereby closing the slot 17, to obstruct the passage of an iron therethrough; while its radius at the root of the teeth is less than the distance from the stud 27, to the adjacent edge of the slot; recesses formed between the teeth being adapted to receive an iron, the upper end of which is in the slot opposite the journal of the wheel. The journal of the wheels to one side of the slot are staggered in respect to the journals of the wheels on the other side of the slot, and the wheels, while their teeth overlap, do not mesh with others, being placed at different levels. In operation, however, each wheel may be connected to either of the adjacent wheels of the opposite set, by an iron, if present in its operative tooth recess.

The wheels 22, 23, 24, and 25, are free to turn on their journals (except as they may be locked by the irons as will be hereinafter described), but mechanism is provided to lock the wheel 26 against rotation during such time as an iron is contained in the enlarged end of the slot. For this purpose, each of the teeth of the last named wheel has a locking stud 28 projecting from the lower face thereof, and adapted to be engaged by a trigger 29, the position of which is controlled by a finger 30, carried by a pivoted lever 31, and contacting with a stud 32 on the trigger. A spring 33 tends to throw the lever across the slot 17, and to such position that the trigger will be moved against the tension of the trigger-spring 34 to free the wheel 26 (see dotted position Fig. 4).

All of the wheels are located to one side of the vertical passing through the center of the depressed bottom of the slot, formed by the strip 15, (see Fig. 1), that a blow iron whose lower end has been placed in the slot 14, and which has its intermediate portion passed sufficiently far into the mouth of the slot 17, will tend to fall over toward the closed end of such slot, and thus to feed against a tooth of the first wheel 24, and the series of wheels.

In the following description of the operation of the device, it will be presumed that a series of irons A, B, C, D, etc., are contained therein, the heads of the irons being within the slot in the base, and resting on the strip therein, while the irons intermediate of their length pass through the slot 17. As shown, one iron A, is within the enlarged end of the slot, and the weight thereof has moved the lever 31 against the tension of its spring, so that the wheel 26 is locked. A second iron is within a tooth space of the wheel 26, and is held by the tooth 261 in front of such space from moving toward the end of the slot. A third iron C rests against the following tooth 262 of the same wheel. A fourth iron D is contained in a toothed space of the wheel 25, and is held against forward movement by the tooth 251 thereof, the wheel itself being locked against forward movement by the end of such tooth bearing on the iron C. One tooth 231, of the wheel 23, projects across the slot 17 between the irons C and D. A fifth iron E, is shown as held by the wheel 22, in the same manner that the iron D is by the wheel 25, and the iron C. Additional irons, F and G, are also shown held by the wheel 24.

It will be understood, that while I have shown seven irons as present in the holder, a less number may, at times, be present. If now, the operator lifts the blow iron A, by a lengthwise movement, out of the end of the slot (which is enlarged to permit the passage of the enlarged gathering head of the iron) the lever 31 will be released, and will, under the influence of the spring 33, be retracted to the position shown in the dotted lines, in which it will move the trigger 29 to the dotted position, thereby releasing the wheel 26 for rotation under the weight of the inclined blow-iron B. The latter iron will thus feed along the slot 17, and striking the retracted lever, restore it to the full line position, it now assuming the position previously occupied by iron A. This movement of the lever will permit the trigger spring to restore the trigger to full line position, whereby the wheel 26 will be locked upon the completion of an angular movement equal to that of a tooth interval, it making such movement under weight of the irons in the slot, whereby the iron C will be moved into the position previously occupied by B. This movement of iron C, also permits a partial rotation of wheels 23 and 25, the iron D, thus moving along the slot until it is arrested by the tooth 263 of the wheel 26, which by the described rotation of the last named wheel has been brought across the slot. In a like manner, the irons E, F, and G move forward, their movements causing, and being permitted, by partial rotation of the wheels 22 and 24. Obviously another iron may be fed into the open end of the slot, which will now take the position previously occupied by iron G. Also it will be seen, that if some of the irons, should be absent, and an iron inserted, it will feed down the slot until it occupies its proper position in respect to the last iron contained therein. Thus, if the irons D and E, were not present, the iron G would rotate the wheel 24, and then the wheel 22, until it reached position E, when, it would be blocked by one of the teeth on the said wheel 25, held in locked position by the iron at position C. If the iron at A be then removed, permitting the forward movement of iron C, and unlocking wheel 25, the iron thus located at E, would feed forward to the position C, permitting rotation of the wheels 22 and 23 to receive other irons. Thus as long as there are two or more irons in the device, one will assume a position at A ready for removal, while another will be at position B ready to move into position A upon the removal of the iron therefrom. If there are no irons in the device, and one be inserted, it will pass directly to position B, where it will strike the retracted lever 31, and move the same forward to assume the position A.

Moreover, it will be seen that the irons will be delivered to position A in the order in which they are fed to the device, which serves therefore as a holder between the times they are cleaned of their moil from the formation of one article, until they are needed to be used in gathering glass for the formation of another article.

It will be noted, that the trigger serves not only to lock the wheel 26, with which it directly engages, but through such irons as may be present, to lock such other wheels of the series as should be locked to prevent the crowding of one iron on another.

Having thus described my invention, what I claim and desire to secure by Letters Patent is:—

1. In a device of the character described, the combination of means for guiding the irons, and means for separating the irons and controlling the feed thereof through the guiding means.

2. In a device of the character described, the combination with means for guiding the irons, of means for separating the irons and controlling the feed thereof, comprising a series of normally unconnected members, adapted to be interconnected for movement by such an iron, and means for controlling the ultimate member of such series.

3. In an iron holder and feeder, the combination with a guide member through which the irons tend to move under the influence of gravity, of a series of toothed wheels arranged on opposite sides of the path of movement of the irons, the several wheels being normally unconnected with each other, but the wheels on opposite sides of the path of movement being adapted to be locked together for movement by an iron contained within their toothed recesses and means for locking the ultimate wheel of such series against movement.

4. In a device of the character described, the combination with means for guiding the irons, of means for separating the irons, said last named means being adapted to be locked in position only when one or more irons are within said guiding means.

5. In a device of the character described, the combination with means for guiding the irons, of means for separating and controlling the feed of the irons through the guiding means, and a locking mechanism controlling and forming a part of said separating means.

6. In a device of the character described, the combination with means for guiding the irons, of means for separating and controlling the feed of the irons through the guiding means, a locking mechanism controlling said separating means, said locking mechanism being actuated only when an iron is within said guiding means.

7. In an iron holder and feeder, the combination with a guide member through which the irons tend to move under the influence of gravity, of a series of overlapping toothed wheels arranged on opposite sides of said guide member, a member positioned in advance of one of the wheels, and means adjacent to said wheel and actuated by said member for controlling the movement of the irons through the guide.

8. In an iron holder and feeder, the combination with a guide member through which the irons tend to move under the influence of gravity, of a series of toothed wheels arranged in staggered relation with each other, means for locking an iron between the projecting teeth of opposite wheels and means for releasing the wheels from such locked position.

Signed at Corning, in the county of Steuben, and the State of New York, this 27th day of May, 1919.

DAVID E. GRAY.